(12) United States Patent
Henry et al.

(10) Patent No.: US 8,960,552 B2
(45) Date of Patent: *Feb. 24, 2015

(54) HAND-HELD DATA COLLECTOR WITH DETACHABLE SCANNER

(71) Applicant: Western Inventory Service Ltd., Mississauga (CA)

(72) Inventors: Todd Henry, Kleinburg (CA); David Whitehouse, Toronto (CA); Sean Davoren, Burlington (CA); Scott Grant, Toronto (CA); Bob Johnston, Cambridge (CA); Thomas H. Lupfer, San Diego, CA (US); David N. West, San Diego, CA (US)

(73) Assignee: Western Inventory Service Ltd., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/956,786

(22) Filed: Aug. 1, 2013

(65) Prior Publication Data

US 2013/0341405 A1 Dec. 26, 2013

Related U.S. Application Data

(63) Continuation of application No. 12/960,124, filed on Dec. 3, 2010, now Pat. No. 8,528,822, which is a continuation-in-part of application No. 29/365,524, filed on Jul. 9, 2010, now Pat. No. Des. 646,282, and a (Continued)

(51) Int. Cl.
  *G06K 7/10* (2006.01)
  *G06F 3/02* (2006.01)

(52) U.S. Cl.
  CPC .......... *G06K 7/10881* (2013.01); *G06K 7/1091* (2013.01); *G06F 3/021* (2013.01); *G06F 3/0213* (2013.01); *G06F 3/0216* (2013.01); *G06F 3/0219* (2013.01)
  USPC ................................. 235/462.46; 235/462.45

(58) Field of Classification Search
  USPC ............. 235/462.45, 462.46, 462.01, 462.44, 235/462.4
  See application file for complete search history.

(56) References Cited

U.S. PATENT DOCUMENTS

| D206,004 | S | 10/1966 | Perkins et al. |
| D224,596 | S | 8/1972 | Winfrey et al. |

(Continued)

FOREIGN PATENT DOCUMENTS

| CA | 2585342 | 4/2006 |
| CA | 136409 | 8/2010 |
| WO | 2006039158 | 4/2006 |

*Primary Examiner* — Daniel St Cyr
(74) *Attorney, Agent, or Firm* — Emerson Thomson Bennett, LLC; Daniel A. Thomson; Sergey Vernyuk

(57) ABSTRACT

Disclosed is data collection apparatus for hand use. The apparatus comprises a body and a bar code scanner. The body has: a central portion adapted to be and gripped in the manner of a joystick; a switch positioned on the central portion and positioned in the manner of a pistol trigger, for finger actuation; a first data entry portion to which the central portion extends, the first data entry portion having at least a 10-digit numeric keypad, each key of said keypad being adapted for and actuable in use by the thumb of said hand; and a second data entry portion from which the central portion extends. The scanner is: adapted for actuation by said switch; has a configuration in which the bar code scanner defines a protuberance extending from the first data entry portion; and is detachable from the body for use in tight spaces.

14 Claims, 7 Drawing Sheets

Related U.S. Application Data continuation-in-part of application No. 29/365,528, filed on Jul. 9, 2010, now Pat. No. Des. 633,501.

(60) Provisional application No. 61/366,741, filed on Jul. 22, 2010.

(56) References Cited

U.S. PATENT DOCUMENTS

| | | |
|---|---|---|
| D226,271 S | 2/1973 | Holtzman |
| D239,287 S | 3/1976 | Ault |
| D240,610 S | 7/1976 | Schwartz |
| D241,751 S | 10/1976 | Jensen et al. |
| 4,007,443 A | 2/1977 | Bromberg et al. |
| D248,946 S | 8/1978 | Koenig |
| D249,345 S | 9/1978 | Oliveira et al. |
| D250,294 S | 11/1978 | Rose |
| 4,158,194 A | 6/1979 | McWaters et al. |
| D257,560 S | 11/1980 | Jang |
| 4,268,721 A | 5/1981 | Nielson et al. |
| D266,501 S | 10/1982 | Stefanik |
| D277,462 S | 2/1985 | Jacobsen et al. |
| D283,711 S | 5/1986 | Deura et al. |
| 4,621,189 A | 11/1986 | Kumar et al. |
| 4,696,189 A | 9/1987 | Hochreuther |
| D292,401 S | 10/1987 | Lee et al. |
| D295,411 S | 4/1988 | Cho et al. |
| D297,429 S | 8/1988 | Pedinielli et al. |
| D298,922 S | 12/1988 | Hinkle |
| D299,235 S | 1/1989 | Feger et al. |
| D302,265 S | 7/1989 | Siegner et al. |
| D302,269 S | 7/1989 | Kelly |
| 4,845,650 A | 7/1989 | Meade et al. |
| D305,884 S | 2/1990 | Krichever et al. |
| D308,359 S | 6/1990 | Lauchnor et al. |
| D311,699 S | 10/1990 | Mo |
| D312,622 S | 12/1990 | Alden et al. |
| D313,563 S | 1/1991 | Mieczkowski et al. |
| 4,983,818 A | 1/1991 | Knowles |
| D319,059 S | 8/1991 | Divine |
| D322,610 S | 12/1991 | Auerbach et al. |
| D324,060 S | 2/1992 | Huang |
| 5,202,817 A | 4/1993 | Koenck et al. |
| D336,619 S | 6/1993 | Dushane et al. |
| D338,002 S | 8/1993 | Kapec et al. |
| D339,994 S | 10/1993 | Rohmann |
| D340,034 S | 10/1993 | Hofstetter et al. |
| D340,236 S | 10/1993 | Sandor |
| D340,237 S | 10/1993 | Swartz |
| D342,723 S | 12/1993 | Fenkart |
| D347,590 S | 6/1994 | Schwan |
| D349,604 S | 8/1994 | Kumar et al. |
| D350,118 S | 8/1994 | Kumar et al. |
| D350,119 S | 8/1994 | Kumar et al. |
| D350,334 S | 9/1994 | Kumar et al. |
| D350,335 S | 9/1994 | Kumar et al. |
| D350,336 S | 9/1994 | Kumar et al. |
| D350,962 S | 9/1994 | Reardon et al. |
| D352,716 S | 11/1994 | Shindo |
| D357,240 S | 4/1995 | Kitazumi et al. |
| D357,876 S | 5/1995 | McConnell |
| D357,917 S | 5/1995 | Ito et al. |
| 5,418,684 A | 5/1995 | Koenck et al. |
| D361,288 S | 8/1995 | Chandwick et al. |
| D363,470 S | 10/1995 | Yamamoto |
| 5,471,042 A | 11/1995 | Kirkeby et al. |
| 5,485,504 A | 1/1996 | Ohnsorge |
| D369,786 S | 5/1996 | Hagerty |
| 5,541,840 A | 7/1996 | Gurne et al. |
| D374,183 S | 10/1996 | Skinner et al. |
| D374,221 S | 10/1996 | Ruiz |
| 5,600,565 A | 2/1997 | Wagner et al. |
| D381,975 S | 8/1997 | Trausch et al. |
| D382,269 S | 8/1997 | Terk et al. |
| D383,124 S | 9/1997 | Lanzaro et al. |
| 5,679,943 A | 10/1997 | Schultz et al. |
| D386,152 S | 11/1997 | Warneke |
| D391,234 S | 2/1998 | Chacon et al. |
| D392,636 S | 3/1998 | Faulknor et al. |
| D393,601 S | 4/1998 | Skiffington |
| D393,628 S | 4/1998 | Ledbetter et al. |
| D393,631 S | 4/1998 | Yotukura |
| 5,796,088 A * | 8/1998 | Wall ..................... 235/472.01 |
| D398,903 S | 9/1998 | Chacon et al. |
| 5,831,819 A | 11/1998 | Chacon et al. |
| D403,259 S | 12/1998 | Tsubota et al. |
| D403,604 S | 1/1999 | Tsubota et al. |
| D404,433 S | 1/1999 | Au Yeung |
| 5,859,419 A | 1/1999 | Wynn |
| 5,923,014 A | 7/1999 | Szymusiak et al. |
| 5,940,808 A | 8/1999 | Joseph |
| D413,537 S | 9/1999 | Grossman et al. |
| D414,470 S | 9/1999 | Chacon et al. |
| D417,445 S | 12/1999 | Chacon et al. |
| D418,132 S | 12/1999 | Zoiss et al. |
| 6,016,481 A | 1/2000 | Failing, Jr. et al. |
| 6,039,256 A | 3/2000 | Konosu et al. |
| 6,046,682 A | 4/2000 | Zimmerman et al. |
| 6,076,023 A | 6/2000 | Sato |
| D429,226 S | 8/2000 | Siddoway et al. |
| 6,097,606 A | 8/2000 | Groves et al. |
| D431,236 S | 9/2000 | Read et al. |
| D434,762 S | 12/2000 | Ikenaga |
| 6,181,992 B1 | 1/2001 | Gurne et al. |
| 6,244,512 B1 | 6/2001 | Koenck et al. |
| 6,253,190 B1 | 6/2001 | Sutherland |
| D447,141 S | 8/2001 | Itoh et al. |
| D477,598 S | 7/2003 | Mathiowetz et al. |
| 6,650,225 B2 | 11/2003 | Bastian, II et al. |
| 6,658,915 B2 | 12/2003 | Sunshine et al. |
| 6,681,990 B2 | 1/2004 | Van der Veen et al. |
| D490,731 S | 6/2004 | Bradford |
| D491,590 S | 6/2004 | Singer et al. |
| D512,698 S | 12/2005 | Augenbraun et al. |
| D522,504 S | 6/2006 | Steiger et al. |
| 7,077,328 B2 | 7/2006 | Krishnaswamy et al. |
| D532,381 S | 11/2006 | Velazquez |
| D535,296 S | 1/2007 | Boulware |
| D548,119 S | 8/2007 | Hernandez, Jr. |
| D560,527 S | 1/2008 | Rich et al. |
| D574,380 S | 8/2008 | Freed et al. |
| D574,831 S | 8/2008 | Kennedy et al. |
| D589,905 S | 4/2009 | Lin et al. |
| D589,928 S | 4/2009 | Haspil et al. |
| D594,361 S | 6/2009 | Miller et al. |
| D594,362 S | 6/2009 | Miller |
| D611,943 S | 3/2010 | Boyd |
| 7,712,669 B2 | 5/2010 | Mahany et al. |
| D633,501 S | 3/2011 | Davoren et al. |
| 2002/0029176 A1 | 3/2002 | Carlson et al. |
| 2003/0041496 A1 | 3/2003 | Hagen et al. |
| 2005/0203790 A1 | 9/2005 | Cohen |
| 2005/0234778 A1 | 10/2005 | Sperduti et al. |
| 2006/0085293 A1 | 4/2006 | Melucci |
| 2006/0095347 A1 | 5/2006 | Melucci et al. |
| 2006/0217876 A1 | 9/2006 | Houri et al. |
| 2007/0262142 A1 | 11/2007 | Whitehouse et al. |
| 2008/0249899 A1 | 10/2008 | Nasser |
| 2009/0210325 A1 | 8/2009 | Borom |

\* cited by examiner

HAND-HELD DATA COLLECTOR WITH DETACHABLE SCANNER

CROSS-REFERENCE TO RELATED APPLICATIONS

This application is a continuation of U.S. patent application Ser. No. 12/960,124, filed Dec. 3, 2010, which: 1) is a continuation-in-part of U.S. Design application Ser. No. 29/365,524, filed Jul. 9, 2010, 2) is a continuation-in-part of U.S. Design application Ser. No. 29/365,528, filed Jul. 9, 2010, and 3) claims the benefit of U.S. Provisional Application No. 61/366,741, filed Jul. 22, 2010, all of which applications are hereby incorporated by reference.

FIELD OF THE INVENTION

This invention relates to the field of apparatus for the collection of data such as inventory data.

BACKGROUND OF THE INVENTION

Accurate inventory information is vital to the success of many businesses engaged in the sales of goods and merchandise. A business, such as a retail store, must maintain a reasonably accurate inventory. This is essential to meeting the demands of its customers and it increases the likelihood that the customer will return to shop. If the retail store is out of one or more items, customers seeking the item will be disappointed. A disappointed customer will most likely shop at another store, and the retail store will lose the customer's purchase. Furthermore, the retail store may lose the customer in the long-term because the customer may conclude that another well-stocked store can better meet their needs. On the other hand, an overstock of inventory results in a waste of capital.

When an item is sold, the inventory level of the item decreases. The retail store typically tries to restock the item before the inventory level becomes too low or the store completely runs out of the item. In order to be able to restock the item before the inventory level gets too low, the retail store must regularly monitor the inventory level. In fact, most retail stores monitor the inventory frequently to ensure they have sufficient products to meet the regular demands of their customers.

Typically, a retail store keeps its inventory information stored in a computerized system. This system will typically not detect errors in inventory levels due to customer or employee theft, shipping or receiving errors and product mislabelling. In order to monitor the inventory accurately, an employee or some other individual must periodically physically count each item to validate the computerized inventory information. In large retail stores that stock thousands of items, it is difficult for a retailer to manually count the items and collect the inventory data.

Retail stores often contract with a service provider to collect and consolidate their inventory data. The service provider usually has operators that use specialized computers or other hand-held machines ("hand-held machines") to collect the inventory data. Outside services are also used to provide an independent opinion count of the inventory levels for financial reporting purposes.

Although the foregoing description emphasizes the retail environment, and inventory applications, it will be understood that expeditious data collection is useful in other applications. Warehousing applications and non-inventory merchandising applications are but two examples.

SUMMARY OF THE INVENTION

Apparatus for collecting data and for use by a hand forms one aspect of the invention. This apparatus comprises a body and a bar code scanner. The body has a central portion, a switch, a first data entry portion to which the central portion extends and a second data entry portion from which the central portion extends. The central portion is adapted to be and gripped in use by said hand in the manner of a joystick. The switch is positioned on the central portion and positioned in the manner of a pistol trigger, for actuation in use by a finger of said hand selected from index finger and middle finger. The first data entry portion has at least a 10-digit numeric keypad, each key of said keypad being adapted for and actuable in use by the thumb of said hand. The bar code scanner is adapted for actuation by said switch and defines a protuberance extending from the first data entry portion.

According to another aspect of the invention, the second data entry portion can comprise a view screen, a navigation switch and two function keys.

According to another aspect of the invention, the keypad can include 10 digit keys and 5 function keys.

According to another aspect of the invention, the body can further comprise a light arrangement capable of producing high intensity red, yellow and green light on demand.

According to another aspect of the invention, the body can be elongate and have a longitudinal axis and the bar code scanner can be orientated at about 45° to the body axis.

According to another aspect of the invention, the central portion can define a waist portion of the body.

Apparatus for collecting data and for use by a hand forms another aspect of the invention. This apparatus comprises a body and a bar code scanner. The body has: a central portion; a switch positioned on the central portion; a first data entry portion to which the central portion extends, the first data entry portion having at least a 10-digit numeric keypad; and a second data entry portion from which the central portion extends, the second data entry portion having at least a navigation switch and a view screen. In this apparatus, the central portion is adapted to be gripped in use by said hand in the manner of a joystick in a first configuration, wherein:

the first data entry portion is disposed above the second data entry portion; the switch is actuable in use by a finger of said hand selected from index finger and middle finger in the manner of a trigger; and each key of said keypad is actuable in use by the thumb of said hand; and a second configuration, wherein: the second data entry portion is disposed above the first data entry portion; and the navigation switch is actuable by the thumb of said hand.

With respect to this apparatus, in use, the view screen has a first orientation when the central portion is in the first configuration and a second orientation, 180° relative to the first orientation, when the central portion is in the second configuration.

According to another aspect of the invention, a bar code scanner, adapted for actuation by said switch and defining a protuberance extending from the first data entry portion, can be provided.

According to another aspect of the invention: the keypad can have 10 digit keys and 5 function keys; the second data entry portion can have a view screen, a navigation switch and 2 function keys; and the navigation switch and 2 function keys can be actuable by the thumb of said hand in the second configuration.

According to another aspect of the invention, the view screen can be a touch screen and the touch screen can be actuable by the thumb of said hand in the second configuration.

Apparatus for collecting data and for use by a hand forms another aspect of the invention. This apparatus comprises a body and a bar code scanner. The body has a central portion, a switch, a first data entry portion to which the central portion extends and a second data entry portion from which the central portion extends. The central portion is adapted to be and gripped in use by said hand in the manner of a joystick. The switch is positioned on the central portion and positioned in the manner of a pistol trigger, for actuation in use by a finger of said hand selected from index finger and middle finger. The first data entry portion has at least a 10-digit numeric keypad, each key of said keypad being adapted for and actuable in use by the thumb of said hand. The bar code scanner is adapted for actuation by said switch and has a configuration in which the bar code scanner defines a protuberance extending from the first data entry portion. The bar code scanner is detachable from the body for use in tight spaces.

According to another aspect of the invention: the body can define a socket; and the bar code scanner can form part of a scanner assembly, the scanner assembly having a plug part which is received in said socket when the bar code scanner is in the configuration in which the scanner defines a protuberance extending from the first data entry portion.

According to another aspect of the invention, the scanner assembly and the body can each incorporate apparatus for storing electricity and the scanner assembly and the body can share these apparatus when attached.

According to another aspect of the invention, the scanner assembly can wirelessly transmit data to the body at least when detached and in use.

According to another aspect of the invention, the scanner assembly can be adapted to be held in the palm of said hand and can have a secondary switch positioned thereon for actuation in use by one of the thumb, the index finger and the middle finger of said hand.

According to another aspect of the invention, the scanner assembly can be adapted to be held in the palm of said hand and can have a secondary switch positioned thereon for actuation in use by the thumb of said hand.

According to another aspect of the invention, the plug part of the scanner assembly can be elongate and can have a longitudinal axis and the bar code scanner can be orientated at about 45° to the plug axis.

According to another aspect of the invention, the plug part can have a groove formed therein traversing the plug part from front to back; and the scanner assembly can have a wrist strap adapted to be wrapped around the plug part and fitted in the groove, thereby to be contained within the socket when the bar code scanner is in the configuration in which the scanner defines a protuberance extending from the first data entry portion.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings and photographs, the latter being briefly described hereinafter.

BRIEF DESCRIPTION OF THE DRAWINGS AND PHOTOGRAPHS

DETAILED DESCRIPTION

Figure 1:
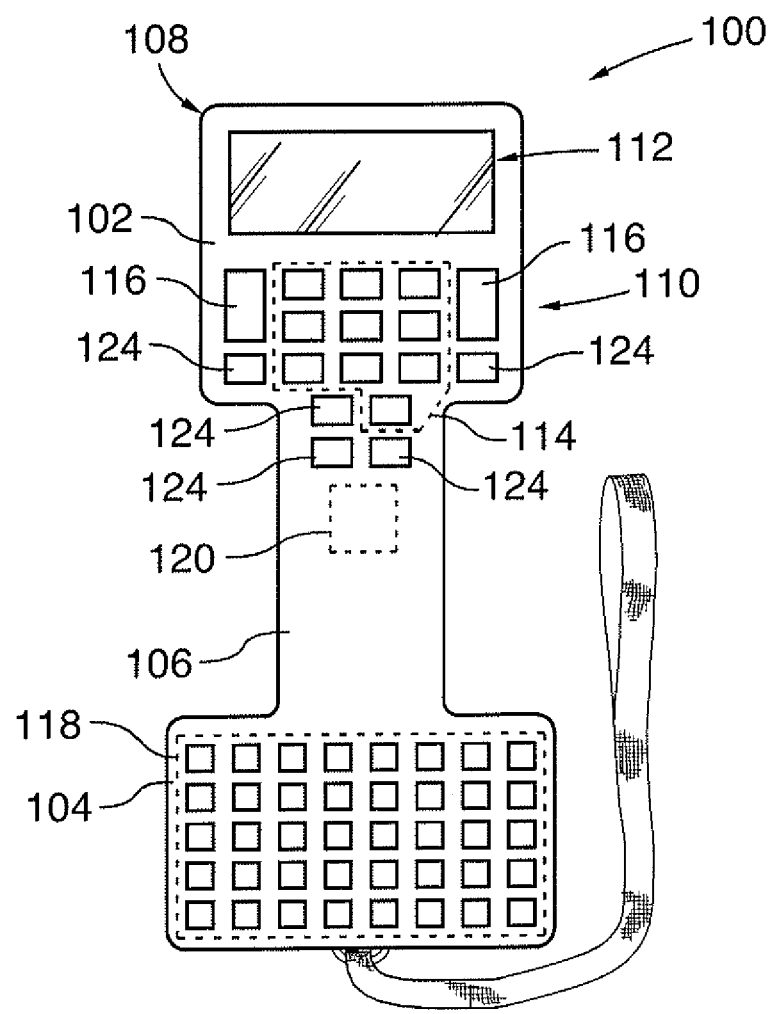
FIG. 1 is a front plan view of a prior art hand-held data collector.

FIG. 1 shows a prior art hand-held data collector 100. Complete construction details of the data collector 100, the manner in which it is used and the manner in which the data collected is handled are provided in US 2007/0262142, and the complete disclosure of this publication is incorporated herein by reference. However, for ease of reference, only, features of this prior art data collector germane to the present invention are set forth briefly below.

The data collector 100 includes a rectangular top 102 and bottom 104 section connected to each other through an elongated middle section 106. The top section 102 houses a bar code scanner 108, a keyboard 110 and a display 112. The keyboard 110 has a 10-digit keypad 114, first and second ENTER keys 116, as well as function keys 124 including Y/PLUS key, a N/MULTIPLY key, a MINUS key, a BACKSPACE key and an END key. The bottom section 104 houses a second keyboard 118. In use, the operator grasps the elongated middle section 106 with one hand. The scanner 108 is activated by pressing a trigger switch on the backside of the middle section with the index or middle finger of the same hand, the trigger switch being indicated in phantom by 120. The operator can use his or her other hand to adjust and move merchandise when necessary. The data collector 100 is shaped and dimensioned to allow the operator to point the scanner 108 at a bar code for scanning The keys 124, 116, 114 are activated using the thumb of the grasping hand. It is noted that the first and second ENTER keys 116 are placed at appropriate locations to allow either a right-handed operator or a left-handed operator to conveniently operate the machine. The remaining keys 124,114 allow an operator to relatively quickly populate a database following a pre-programmed loop. Typically, for each job, the devices are pre-programmed by the team leader to follow a loop specific to the job. For example, in cases where the operator was required to take inventory on a shelf-by-shelf basis of each product, including quantities, the device would be programmed to permit the END key to be used by the operator to signify that a shelf had been inventoried. Following entry of the END key, the operator would be prompted to enter the number of the next shelf to be inventoried. Once the number of the shelf had been keyed, selection of the ENTER key causes the device to enter the inventory loop, i.e.

scan a barcode, by depressing the trigger 120, or collecting the barcode by manually keying the digits thereof and selecting ENTER entering the quantity of the product by keying in the number of products visually counted, followed by ENTER, or following an arithmetic calculation using the calculator keys [numeric and arithmetic operator keys], followed by ENTER.

The BACKSPACE key has the function normally expected, i.e. it reverses the last keystroke, to permit corrections.

This machine arrangement has proven advantageous in use in terms of the speed by which accurate data collection can be safely carried out by skilled operators. Without intending to be bound by theory:

- the hand-grippable middle section 106, the scanner 108 and the trigger switch 120 are configured in the manner of a conventional gun-type scanner, for relatively high speed single-item scanning; this is advantageous, as single-item scanning forms a large part of the effort associated in the data collection business
- the placement of the numeric keypad 114, arithmetic operator keys and ENTER keys [124] is such that, in a relatively short period of time, most operators develop substantial thumb dexterity, and can relatively quickly enter numerics using only the thumb of the grasping hand; this is advantageous, as numeric entry is quite common in the data collection business, and in many situations, it is quite advantageous to be able to enter data with one hand and leave another hand free, for example, to keep track of the location to which the operator has counted in a rack of shirts
- the keyboard 118 is on hand at all times, out of the way during scanning, and usable by the non-grasping hand, for entry of small data blocks, which needs to be done occasionally.

Hand-held apparatus for collecting inventory data which forms an inventive improvement to the prior art data collector is illustrated in FIGS. 2-5 and indicated by general reference numeral 20 and will be seen to include a body 22 and a bar code scanner 28. It will be evident that this device maintains the advantages of the prior art device, in that it includes:

- a hand-grippable central portion 26, a scanner 28 and a trigger switch 30 configured in the manner of a conventional gun-type scanner
- a first data entry portion 32, i.e. a keypad with number keys 34 and 5 function keys 36, positioned to permit numeric counts using only the thumb of the grasping hand; and
- a second data entry portion, i.e. a keyboard, this time in the form of a touch screen display 38, from which the central portion extends and usable by the non-grasping hand.

Figure 6:
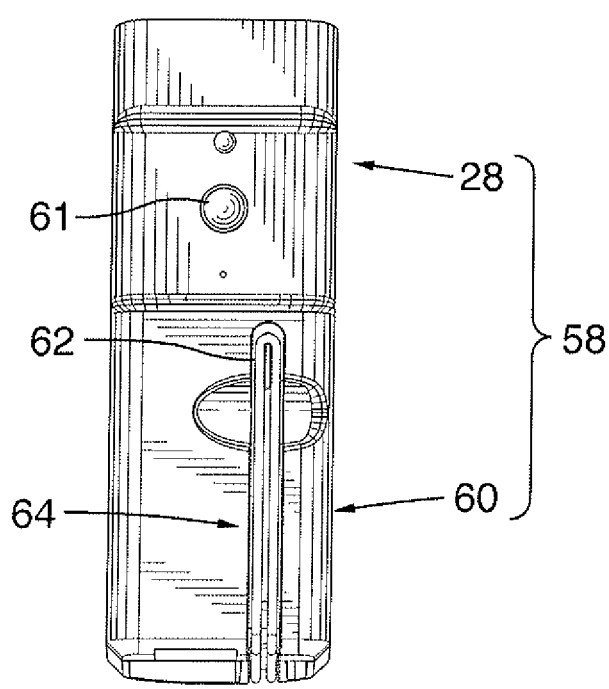
FIG. 6 is a front view of a part of the collector of FIG. 2.
Figure 7:
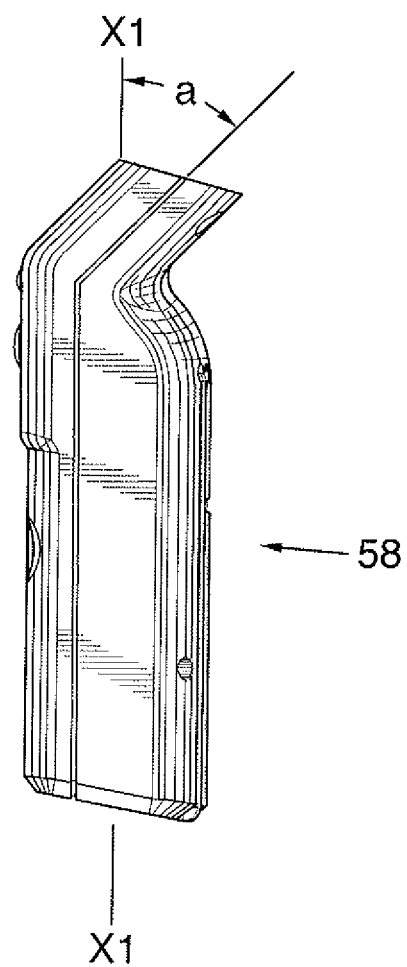
FIG. 7 is a right side view of the part of FIG. 6.
Figure 8:
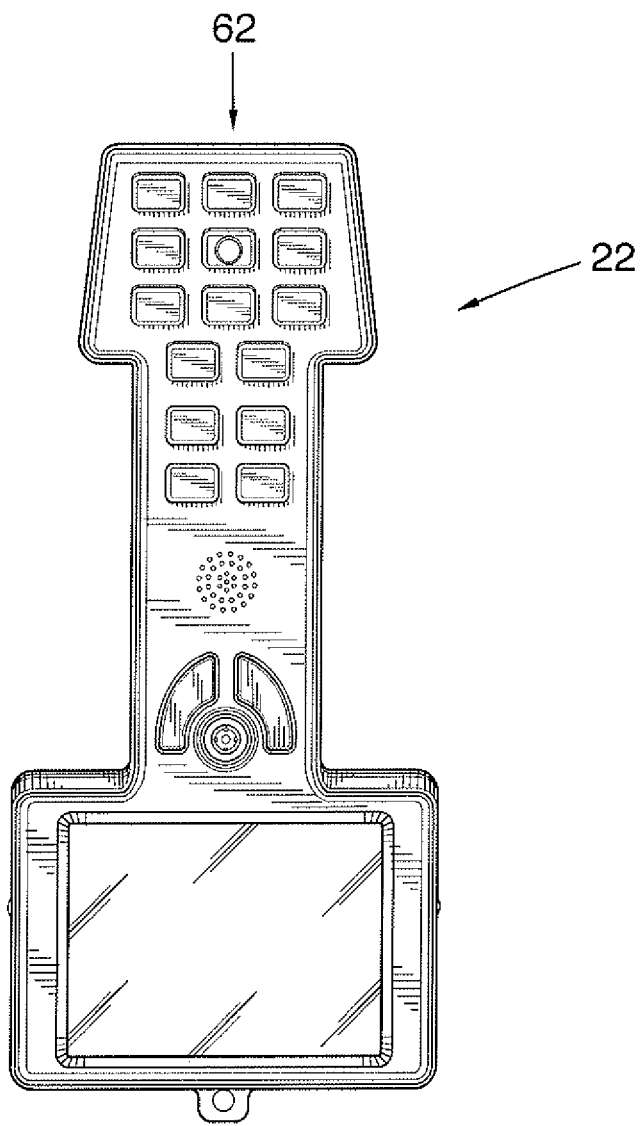
FIG. 8 is a view of the structure of FIG. 2 with the structure of FIG. 6 removed therefrom.

However, with reference to earlier mentioned FIGS. 2-5, as well as FIGS. 6-8, it should be understood that the present device incorporates numerous variations over the prior art device, namely:

- a protuberance, which defines the scanner 28 and which is detachable
- internal apparatus for storing electricity in the body 22 and power sharing circuitry (not shown)
- the aforementioned touch screen display 38
- a pair of function keys 40 and a navigation switch 42
- an accelerometer internal of the body 22
- a finger strap 44
- wireless communication circuitry internal to the body 22
- a microphone 48
- a speaker 50
- camera 52
- flash 54
- performance lights 56

Figure 2:
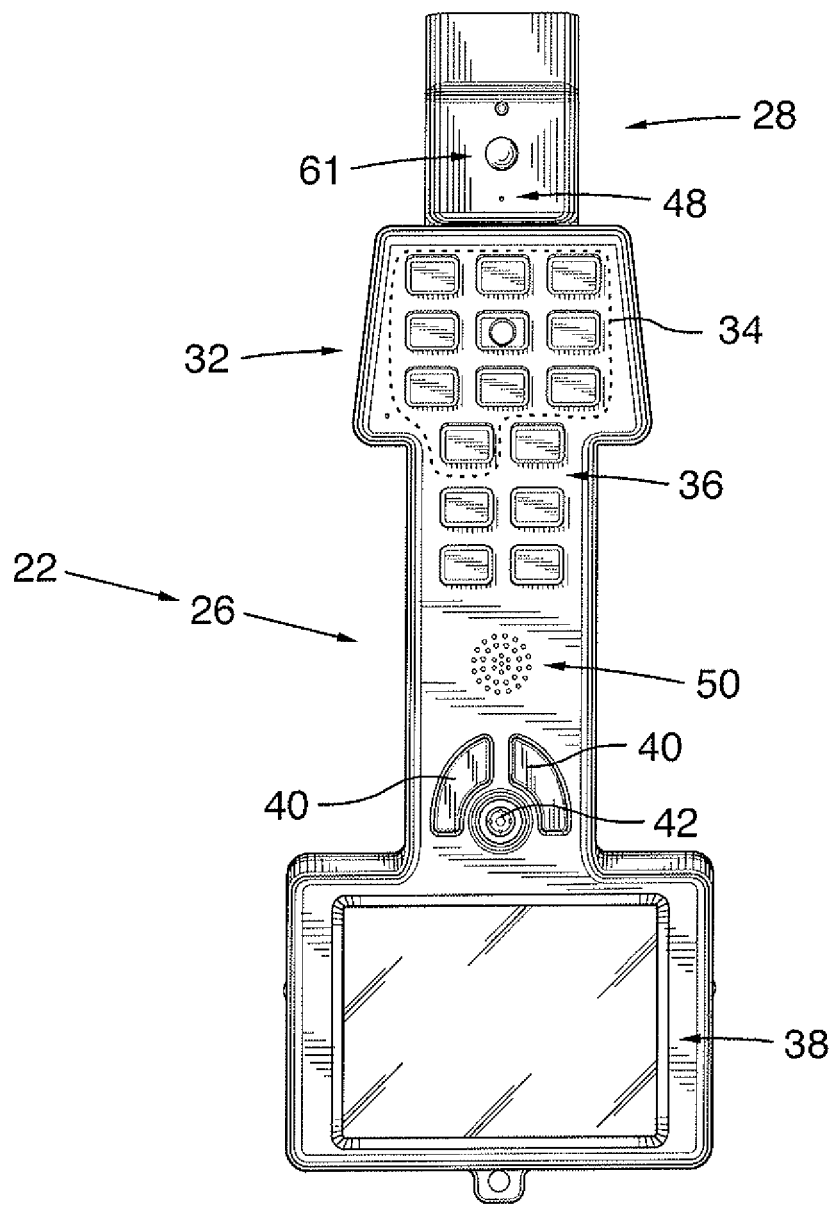
FIG. 2 is a front plan of a hand-held data collector according to an exemplary embodiment of the invention.
Figure 3:
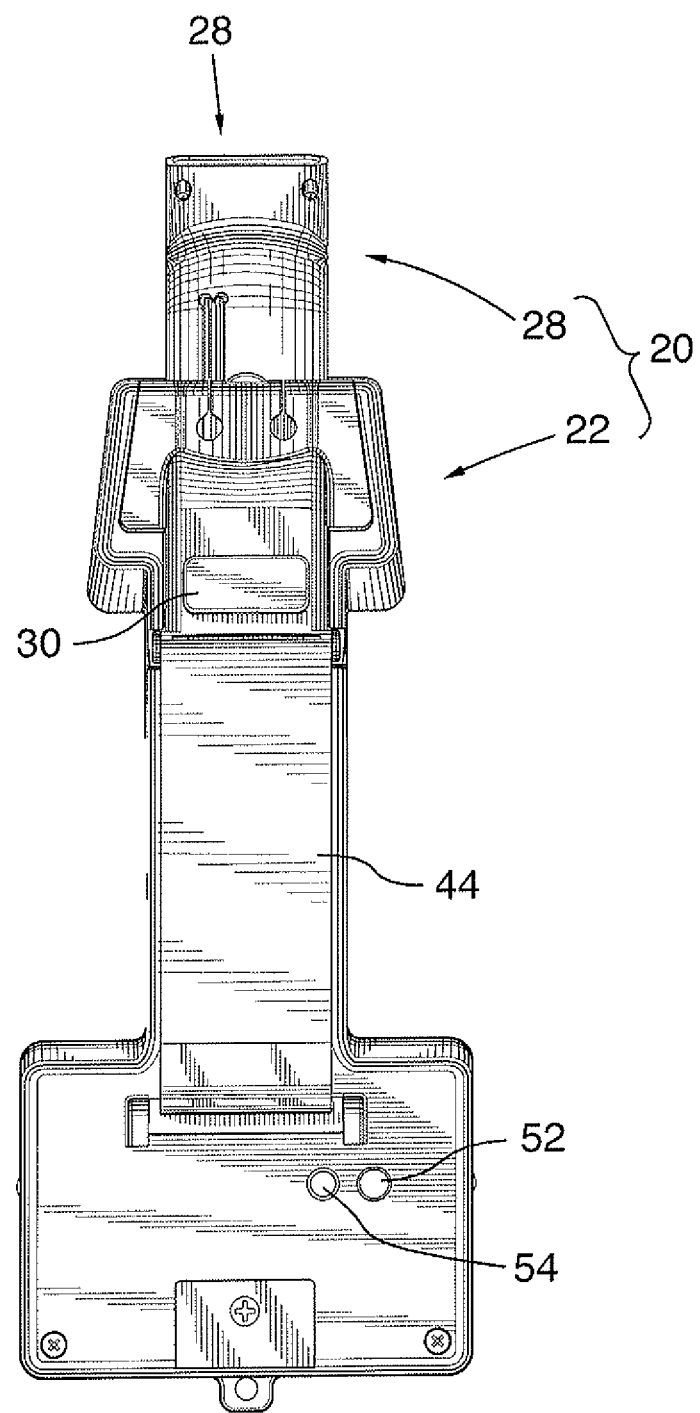
FIG. 3 is a rear view of the collector of FIG. 2.
Figure 4:
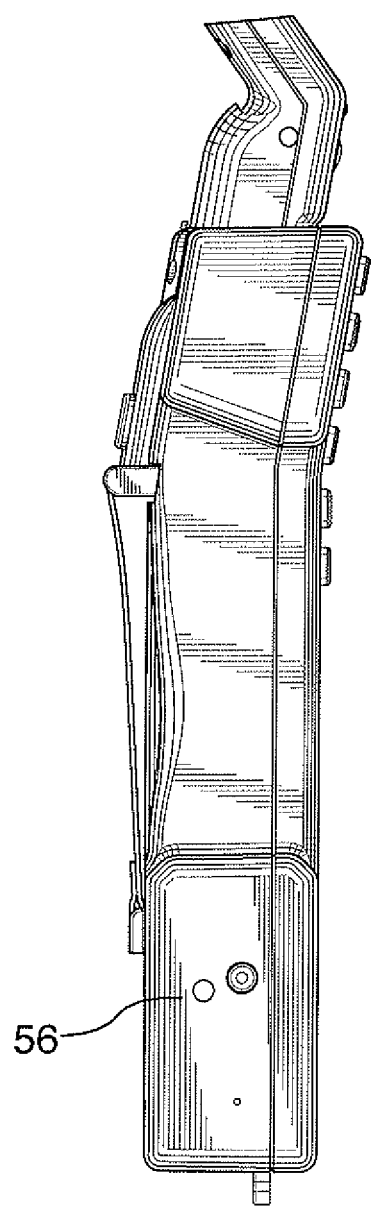
FIG. 4 is a left side view of the collector of FIG. 2.
Figure 5:
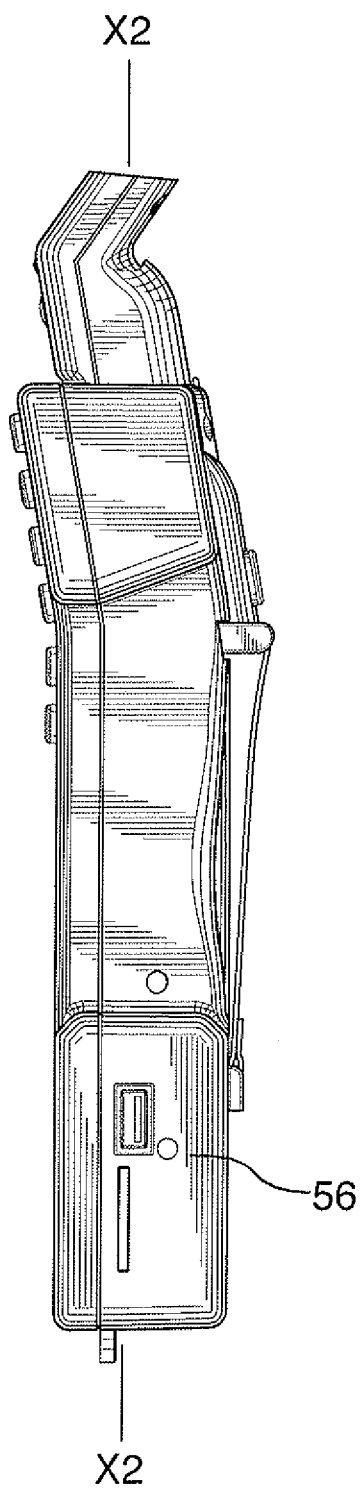
FIG. 5 is a right side view of the collector of FIG. 2.

Turning first to the detachable bar code scanner 28, persons of ordinary skill in the art will appreciate that, sometimes, scanning must be done in tight spaces. By forming the bar code scanner 28 as a protuberance, i.e. projecting from and narrower than the first data entry portion 32, rather than as an extension of the keypad as in the prior art, scanning is facilitated generally. Further, the bar code scanner 28 is formed as part of a bar code scanner assembly 58 which includes a plug part 60 that, as shown in FIG. 2-4, is received in a socket 62 formed in the body 22 and which, as indicated in FIGS. 5-8, can be withdrawn from the socket 62, held in the palm of the user and actuated by thumb-depression of a switch 61. This permits scanning in particularly tight spaces.

To provide such detachability, the bar code assembly 58 has an internal apparatus for storing electricity, i.e. a battery, and has internal wireless circuitry which transmits, by Bluetooth and in real time, the scanned data to the body 22. When attached, as shown in FIGS. 2-5, a fixed link is provided between the scanner 28 and the body 22 for data transmission, to avoid the power draw associated with wireless transmission and extend battery life. The power sharing circuitry, coupled with electricity storage devices in both the bar code scanner 58 and the body 22, provides advantage in use, in that inter alia, it lessens the likelihood that either device will require a charge before the other (which takes away from operator productivity). It will be noted that the bar code scanner 28 is orientated at an angle a that is approximately 45° to the longitudinal axis X1-X1 of the plug part 60. This has been found to be advantageous in terms of ergonomics when scanning.

Notable in respect of the bar code scanner assembly 58 is the presence of a groove 64 formed in the plug part 60, traversing the plug part 60 from front to back, and a wrist strap 62 adapted to be wrapped around the plug part 60 and fitted in the groove 64, thereby to be contained within the socket 62 when the bar code scanner 28 is in the configuration in which the scanner 28 defines a protuberance extending from the first data entry portion 32, i.e. as shown in FIGS. 2-5. By this arrangement, the wrist strap 62 is always kept nearby, to minimize the risk of damage when the bar code scanner 28 is detached and properly used. At the same time, the wrist strap 62 is not in the way when the bar code scanner 28 is properly stored in socket 62.

The touch screen display 38 allows for the removal of the fixed prior art LED display which has advantage in terms of increased flexibility. As well, movement of the display 38 to the other end of the device further minimizes the dimensions of the device at the scanning end, which can have advantage when scanning in tight spaces.

The pair of function keys 40 and the navigation switch 42 provide redundant controls for the touch screen 38, in the event that the touch sensor fails. In this regard, it will be noted that, by providing a touch screen display 38, great flexibility in terms of data entry procedures can be accommodated, and this is advantageously menu driven. The navigation switch 42 is of the multi-directional sensor type, i.e. akin to a track ball or joystick, and can be used to navigate the cursor through the menus and to enter a selection, by depression of the switch 42. The function keys 40 can be used in a manner analogous to the L/R buttons on a computer mouse. This arrangement has been found to be user-friendly and an adequate substitute for the touch screen interface in the event of malfunction.

These lower function keys 40 can also be used to supplement the 5 function keys 36 provided as part of the first data entry portion. By way of further explanation, in the prior art, 7 function keys were provided, namely, [ENTER], [ENTER], [BACKSPACE], [PLUS/Y], [MULTIPLY/N], [MINUS] and [END]. In the exemplary embodiment, only 5 function keys 36 are thumb-actuable: [ENTER], [BACKSPACE], [PLUS/Y], [MULTIPLY/N] and [END]. The function keys 40 flanking the navigation switch 42 can be programmed to service as [MINUS] and [DECIMAL] which are relatively infrequently used in comparison to the previous 5 keys mentioned. The 5 function keys 36 in the exemplary embodiment function generally in a manner analogous to the 7 function keys of the prior art, accordingly, further detailed description is neither required nor provided.

The accelerometer allows the device to identify its relative orientation in space. This permits further leveraging of the touch screen display 38, and the benefits of the navigation switch 42 and function keys 40. More specifically, the accelerometer allows the device to ascertain if it is positioned in a configuration, ie. with the first data entry portion 32 above the second data entry portion 38, or in a second configuration, with the second data entry portion 38 above the first data entry portion 32, and adjusts the display 38 of the device accordingly, so that text can be read.

Notably,
in the first configuration, the trigger switch 30 is actuable by the index or middle finger of the grasping hand and the numeric 34 and 5 function keys 36 of the first data entry portion 32 are positioned to permit numeric counts using only the thumb of the grasping hand;
in the second configuration, the navigation switch 42, function keys 40 and touch screen 38 are actuable in use by the thumb of said hand when the second portion is gripped by said hand in the second configuration.

The finger strap 44 has the function and advantage one would expect therefrom, namely, to loosely strap the grasping hand of the operator to the backside of the device, to reduce the likelihood that the device will become dislodged from the hand and exposed to damage and to reduce hand strain.

A belt clip (not shown) permits the device to be hung from the belt of a user when not in use generally, and also when the scanner 28 is detached.

The wireless circuitry contained within the body 22 allows the device to transfer data to a wireless hub. This wireless connection avoids the need present in the prior art for periodic data downloads. The wireless hub can, for example, be a PC or laptop. When the wireless hub is connected to the Internet, the devices can communicate by SMS messaging via this wireless connection. In this regard, it is notable that the second data entry portion can be held in two hands, and manipulated with two thumbs, for expeditious typing on the touch screen. The device also is provided with a USB port and a SD flash card slot. This permits the device to be connected to the Internet via a cellular network or a land line, for the same purposes as indicated above.

The microphone 48 and speaker 50, in combination with the wireless circuitry, enables the device to operate as a wireless phone by VOIP. As well, the microphone 48 allows the collection of data in the form of spoken words, and the speaker allows for, inter alia, audio playback of spoken word inventory data. Further, in combination with the touch screen 38, full audio/visual messaging can be provided to the operators, which is useful for training purposes and the like.

The camera 52 allows the collection of static and dynamic video inventory data.

The flash 54 allows operation of the camera 52 in low light conditions. The flash 54 also functions as a flashlight, to facilitate visual inventory operations in low light conditions.

The performance lights 56 selectively shine either green, red or yellow, and are adapted to be visible at distances by which a team leader or supervisor might be expected to be removed from the members of his or her team during the course of a job. This permits the pre-loaded program for the day to trigger lights which are indicative of the productivity of the operator, i.e. devices carried by operators functioning at high productivity emit green, operators functioning at satisfactory productivity emit yellow and operators functioning at unsatisfactory productivity emit red. Without intending to be bound by theory, it is believed that this arrangement has advantage in terms of creating conditions conducive for high productivity.

Whereas but a single embodiment is herein described, persons of ordinary skill in the art will appreciate that variations are possible.

For example, whereas the device is indicated to be held and operated with one hand, only, this is not necessarily. In the context of 'financial counts', for example, where bar code scanning is not required, the device could be held with one hand and typed upon by another, in the manner of a standard calculator.

Whereas Bluetooth is specifically mentioned, any type of wireless communication protocol can be used.

Whereas the bar code scanner of the exemplary embodiment is palm held and thumb-actuated, it should be understood that it could equally be actuated by, for example, the forefinger and index finger, and could take the form of a wand or stylus. Further, whereas a scanning angle of 45° to the axis of the plug part (and the axis of the body itself) is specified, this is not required; the scanner could operate parallel to the axis X2-X2 of the body, and at other angles.

Accordingly, the invention should be understood as limited only by the accompanying claims, purposively construed.

Having thus described the invention, it is now claimed:

1. Apparatus for collecting data and for use with a hand, said apparatus comprising:
a body having
a central portion adapted to be and gripped in use by said hand in the manner of a joystick;
a switch positioned on the central portion and positioned in the manner of a pistol trigger, for actuation in use by a finger of said hand selected from index finger and middle finger;
a first data entry portion to which the central portion extends, the first data entry portion having at least a 10-digit numeric keypad, each key of said keypad being adapted for and actuable in use by the thumb of said hand; and
a second data entry portion from which the central portion extends;
wherein the second data entry portion comprises a view screen and a navigation switch.

2. Apparatus according to claim 1, wherein the keypad includes 10 digit keys and 5 function keys.

3. Apparatus according to claim 1, wherein the body further comprises a light arrangement capable of producing high intensity red, yellow and green light on demand.

4. Apparatus according to claim 1, wherein the central portion defines a waist portion of the body.

5. Apparatus according to claim 1 further comprising a bar code scanner adapted for actuation by said switch.

6. Apparatus according to claim 5, wherein the bar code scanner has a configuration wherein the scanner wirelessly transmits data to the body.

7. Apparatus according to claim 6, wherein the bar code scanner is detachable from the body and wirelessly transmits data to the body when in use and detached.

8. Apparatus according to claim 7, wherein the scanner and the body each incorporate apparatus for storing electricity, and the scanner and the body share these apparatus when attached.

9. Apparatus according to claim 7, wherein the scanner is adapted to be held in the palm of said hand and has a secondary switch positioned thereon for actuation in use by the thumb of said hand.

10. Apparatus according to claim 5, wherein the scanner is adapted to be held in the palm of said hand and has a secondary switch positioned thereon for actuation in use by one of the thumb; the index finger; and the middle finger of said hand.

11. Apparatus for collecting data and for use with a hand, said apparatus comprising:
- a body having a central portion adapted to be and gripped in use by said hand in the manner of a joystick;
- a switch positioned on the central portion and positioned in the manner of a pistol trigger, for actuation in use by a finger of said hand selected from index finger and middle finger;
- a first data entry portion to which the central portion extends, the first data entry portion having at least a 10-digit numeric keypad, each key of said keypad being adapted for and actuable in use by the thumb of said hand;
- a second data entry portion from which the central portion extends; and
- a bar code scanner adapted for actuation by said switch, the bar code scanner having a configuration wherein the scanner wirelessly transmits data to the body.

12. Apparatus according to claim 11, wherein the scanner assembly and the body each incorporate apparatus for storing electricity and the scanner assembly and the body share these apparatus when attached.

13. Apparatus according to claim 11, wherein the scanner assembly is adapted to be held in the palm of said hand and has a secondary switch positioned thereon for actuation in use by one of the thumb; the index finger; and the middle finger of said hand.

14. Apparatus according to claim 11, wherein the scanner assembly is adapted to be held in the palm of said hand and has a secondary switch positioned thereon for actuation in use by the thumb of said hand.

\* \* \* \* \*